(12) United States Patent
Wen

(10) Patent No.: US 7,973,506 B2
(45) Date of Patent: Jul. 5, 2011

(54) METHOD AND DEVICE FOR CONTROLLING POWER CAR WINDOW LIFT

(76) Inventor: Yuanhong Wen, Deyang (CN)

( * ) Notice: Subject to any disclaimer, the term of this patent is extended or adjusted under 35 U.S.C. 154(b) by 491 days.

(21) Appl. No.: 12/137,554

(22) Filed: Jun. 12, 2008

(65) Prior Publication Data

US 2008/0309263 A1 Dec. 18, 2008

(30) Foreign Application Priority Data

Jun. 13, 2007 (CN) .......................... 2007 1 0049312

(51) Int. Cl.
*H02P 7/00* (2006.01)
(52) U.S. Cl. ......... 318/468; 318/264; 318/466; 318/467
(58) Field of Classification Search .................. 318/264, 318/265, 266, 283, 284, 445, 466, 467, 468, 318/469; 49/26, 28, 31
See application file for complete search history.

(56) References Cited

U.S. PATENT DOCUMENTS

| | | | | |
|---|---|---|---|---|
| 5,334,876 A | * | 8/1994 | Washeleski et al. | ......... 307/10.1 |
| 5,483,135 A | * | 1/1996 | Parks | ............................ 318/469 |
| 5,585,702 A | * | 12/1996 | Jackson et al. | ................. 318/266 |
| 5,596,253 A | * | 1/1997 | Mizuta et al. | ................. 318/469 |
| 5,714,854 A | * | 2/1998 | Mizuta et al. | ................. 318/266 |
| 6,236,176 B1 | * | 5/2001 | Uebelein et al. | ............... 318/287 |
| 6,563,279 B2 | | 5/2003 | Sugawara | |

* cited by examiner

*Primary Examiner* — Bentsu Ro
*Assistant Examiner* — Thai Dinh
(74) *Attorney, Agent, or Firm* — Eagle IP Limited; Jacqueline C. Lui

(57) ABSTRACT

The invention discloses a method for controlling a power car window lift. The method includes the following steps: detecting an operation state signal of the car window with a detection element; inputting the detection signal of the detection element into the controller; and the controller sending a control signal to an actuator, which controls the operation state of the car window lift. The main control element of the controller is a thyristor or an equivalent functional element. The car window lift's operation state signal includes a car window closed obstacle signal, a car window closed-in-place signal, a car window opened-in-place signal, and a car window opened obstacle signal. The invention further discloses a device for implementing the method for controlling the power car window.

6 Claims, 4 Drawing Sheets

METHOD AND DEVICE FOR CONTROLLING POWER CAR WINDOW LIFT

CROSS-REFERENCE TO RELATED APPLICATION

This application claims benefit of China Application No. 200710049312.1 filed on Jun. 13, 2007, which is hereby incorporated by reference herein in its entirety.

FIELD OF THE INVENTION

The invention relates to a method and device for controlling a power car window lift, and particularly to a method and device for controlling a power car window that is provided with an anti-pinch protection function and a overload protection function. It belongs to the realms of car electronics and automatic control.

BACKGROUND OF THE INVENTION

In addition to the basic function of controlling opening and closing a car window, a power car window lift controller should also have a function of safety protection control, which is divided into anti-pinch control and overload control.

The anti-pinch control relates to personal safety, and has been a difficulty of safety control. A driver or passenger (especially a child) often gets hurt from being pinched by a power car window without the anti-pinch function when he/she carelessly stretches his/her head or hand out of the car window while it is closed. A MCU plus a dedicated(special) chip plus a memory chip plus various sensors is currently widely adopted at home and abroad to realize the anti-pinch control. Still some international companies adopt CAN bus and LIN bus technologies, while some Taiwan companies a method of a dedicated chip+sensors.

The overload control means that a driving motor will be overload when the car window is opened or closed in place, i.e. arrives at the bottom or upper dead center, or when a mechanical block appears during the car window is opened or closed. The controller should be switch off the motor in time, so as to prevent the motor damaging due to overload. A bimetallic strip or a PTC thermistor serially connected in the armature loop of the motor is currently widely adopted at home and abroad. Its work principle is as below: When the motor armature is locked, the current attains the highest, and the armature winding and the bimetallic strip or the PTC thermistor are heated up quickly because of overcurrent. When the temperature attains a certain value, the bimetallic strip or the thermistor turn off, thus the armature current being cut off and the motor protected. The advantage of doing so is a low cost. Its weaknesses are that an overcurrent protection element responds too slowly, and the armature winding is prolongably overloaded, which make the insulation tend to age and the service life shortened. Particularly, if a window control switch is not released, the motor will be started again after the overcurrent protection element is cooled and reset. Then the motor will be started-locked-switched off periodically. During this process, the lift mechanism, the control switch and the armature winding endure an intensive overcurrent shock, which will surely shorten the service life and lower reliability of the power car window lift. Meanwhile, the bimetallic strip and the thermistor will be out of order because of the prolonged overcurrent.

CONTENTS OF THE INVENTION

A purpose of the invention is to provide a method and device for controlling a power car window lift. This device has quick response, high reliability, simple structure, and low cost.

The technical solution of the invention is as below.

A method for controlling a power car window lift is provided, the method including the following steps:

detect a current signal of the driving motor of car window lift with a detection element, obtain operation state signal of the car window lift;

input the detected operation state signal of the car window lift into a controller; and the controller sends a control signal to an actuator, which controls the operation state of the car window lift;

The method is characterized by the controller whose main control element is a thyristor or an equivalent functional element.

A device for controlling a power car window lift is provided, the device including the following elements:

A car window closed obstacle signal detection element, controller and actuator;

a car window opened-in-place signal detection element, controller and actuator;

a car window closed-in-place signal detection element, controller and actuator; and a car window opened obstacle signal detection element, controller and actuator.

The signal detection element detects the car window operation state. The controller receives the detection signal, an operational command, an intermediate signal, etc., and sends the control signal to the actuator.

The car window closed obstacle controller includes a stop controller and a reverse rotation controller. The stop controller receives the closed obstacle signal, and completes the stop control. The reverse rotation controller receives a stop signal, and completes the reverse rotation control.

The control element of the controller includes a main control element and an auxiliary control element, the main control element being a thyristor or an equivalent functional element.

The actuator is a relay or an MOS field effect transistor.

The signal detection element is a resistor.

The car window closed obstacle controller includes the stop controller and the reverse rotation controller.

The reverse rotation controller has a blanking (or blocking) element, which is a dry reed switch.

The invention has the following beneficial technical effects:

Because of application of the thyristor, the circuit structure is simple, and the manufacturing cost is low, which overcome the shortcomings with a MCU and a memory that have a complicated structure and a high manufacturing cost. Moreover, using a resistor as the detection element of a sampling circuit does not have any time delay, and a high-power highly-sensitive relay is adopted for power-off protection, with the action time about 10 ms. This car window lift controller has quick response, high reliability, and good stability, and the motor is endurable, which will greatly prolong service life of the power car window.

DETAILED DESCRIPTION OF THE UTILITY MODEL

Figure 1:
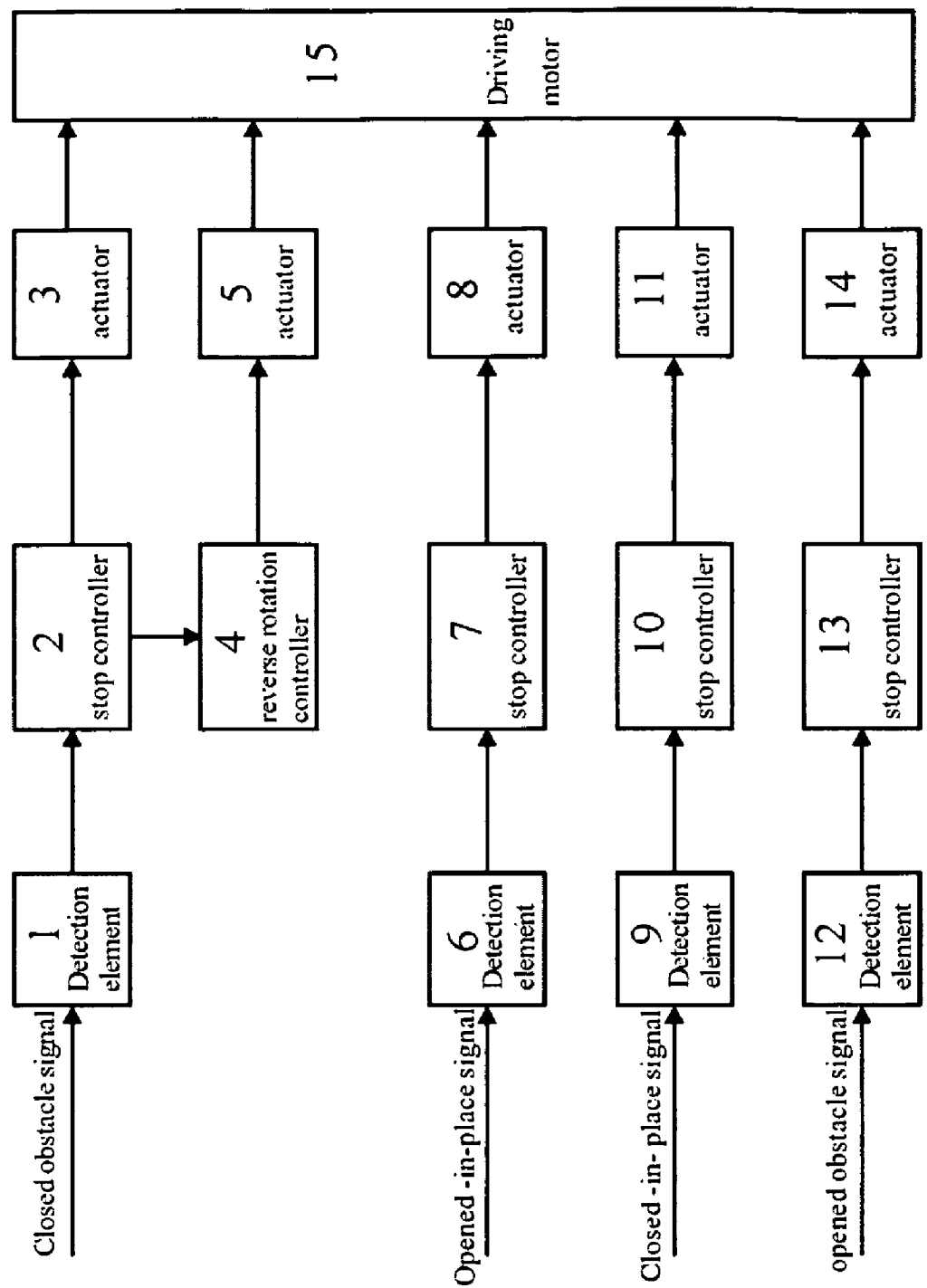
FIG. 1 is a structural block diagram of the invention.

As shown in FIG. 1, the device for controlling the power car window lift includes the following elements: A car window closed obstacle signal detection element 1, stop controller 2 and the actuator 3 thereof, as well as reverse rotation controller 4 and the actuator 5 thereof; a car window opened-in-place signal detection element 6, stop controller 7 and actuator 8; a car window closed-in-place signal detection element 9, stop controller 10 and actuator 11; and a car window opened obstacle signal detection element 12, stop controller 13 and actuator 14. Each actuator sends a control signal to a driving motor 15, respectively, to control its work state.

The principle of this control device is as below: When the car window is normally opened or closed in place, or locked because there is an obstacle during the opening process, the detection element converts the lock signal into an electric signal, which is converted by the controller into a corresponding control signal, with which the actuator controls stop of the motor, thus protecting the motor from being damaged. If an obstacle appears during the closing process, the reverse rotation controller 4 sends out a reverse rotation signal at the same time, with which the actuator controls reverse rotation of the motor, making the car window immediately move downward and release the pinched thing, thus alleviating injury to the pinched person. When the car window arrives at the bottom dead center, the motor will be switched off automatically, so as to prevent the motor from being damaged due to prolonged overload.

The main characteristic of this controller is as below: An analog circuit and a common electronic element are adopted in the control circuit, where a thyristor or its equivalent functional element is used as the main control element, a relay or an MOS field effect transistor as the actuator, and a resistor as the signal detection element, thus the cost being significant lowered.

The invention will be explained in detail below with reference to embodiments.

Embodiment 1

Figure 2:
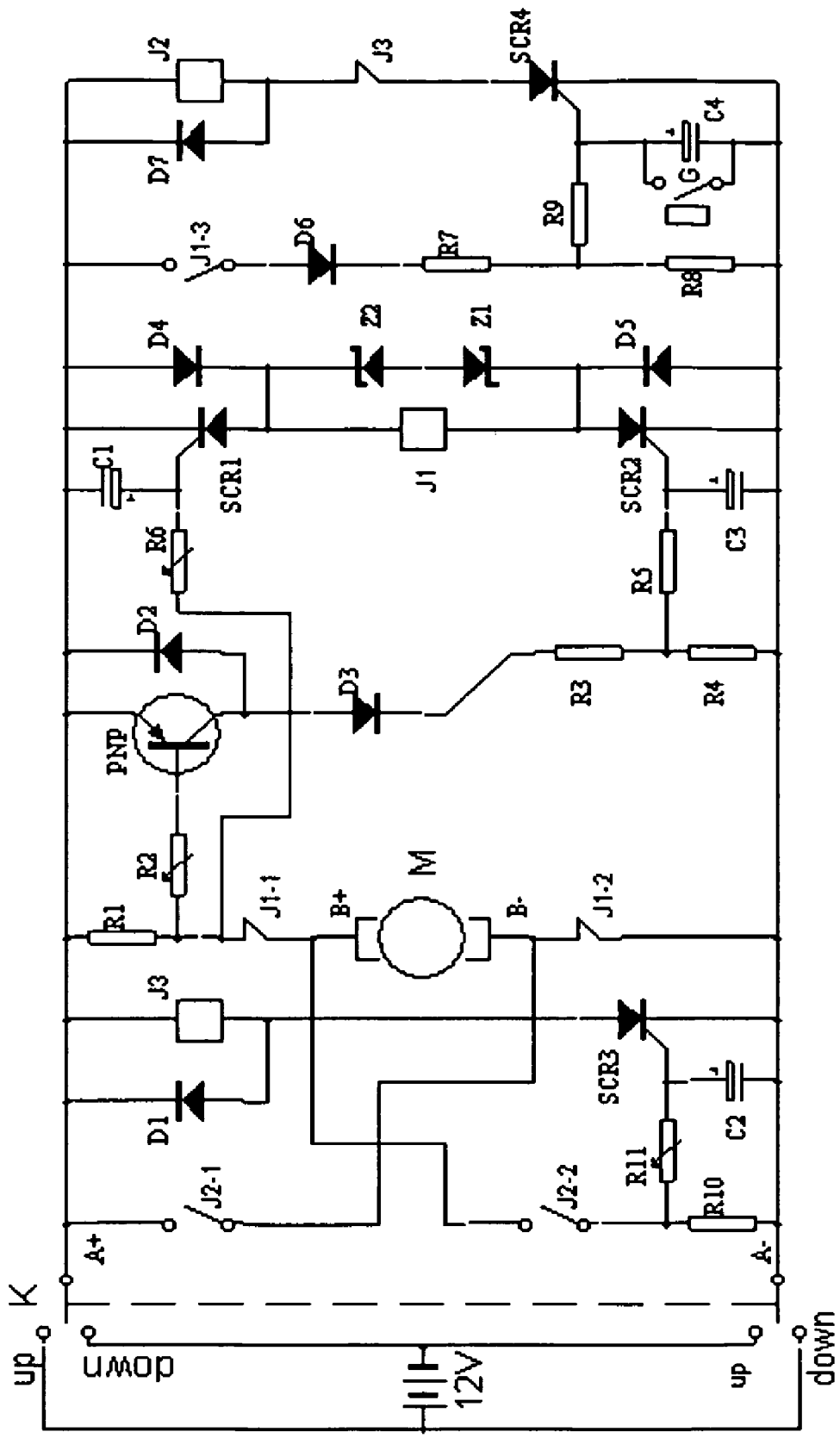
FIG. 2 is a circuit diagram of the invention.

In FIG. 2, a control switch K is a double pole double throw gang power switch; R1 is a shared up/down sampling resistor; R10 is a returning-to-bottom sampling resistor; SCR2 is an up control thyristor; SCR1 is a down control thyristor; SCR4 is an anti-pinch returning control thyristor; SCR3 is an anti-pinch returning-to-bottom stop control thyristor; J1 is a shared up/down control relay, and has two pairs of normally closed contacts J1-1 and J1-2 as well as one pair of normally open contacts J1-3; J2 is an anti-pinch returning control relay, and has two pair of normally open contacts J2-1 and J2-2; J3 is an anti-pinch returning-to-bottom stop control relay, and has one pair of normally closed contacts J3-1; R2 is an anti-pinch force regulation potentiometer; R6 and R11 are lock-protection current-regulation potentiometers; G is a safety-area blockage dry reed switch, whose magnet is installed on a lift arm of the car window lift and moves up and down with the lift arm, and whose switch is fixedly installed on path of the lift arm and 4 mm away from the dead center of the car window; C1-C4 are time delay capacitors; D1, D7, Z1 and Z2 are freewheeling diodes; D2-D6 are reverse isolation diodes; and a PNP transistor is used as an inverter.

The work process is as below:

When the control switch K is in the "up" position, the supply voltage is applied to a driving motor M via the sampling resistor R1 and the two pairs of normally closed contacts J1-1 and J1-2 of J1, the motor M drives the window to move upward, and the sampling resistor detects current of the motor continuously. When something is pinched by the car window (or a mechanical block appears), the operation resistance of the window will be increased, and then so will the current of the motor M. When the obstacle (resistance) attains a set anti-pinch force value, the sampling voltage drives the PNP transistor on, the output voltage of whose collector is divided after D3 by R3 and R4. The partial voltage on R4 directly triggers the thyristor SCR2 via R5, the relay J1 is on, the two pairs of normally closed contacts J1-1 and J1-2 of J1 are parted with the driving motor M, and the window stops moving. Meanwhile, one pair of normally open contacts J1-3 of J1 is on. The supply voltage is divided by R7 and R8 after the normally open contact J1-3 of J1 and D6. The partial voltage on R8 directly triggers the thyristor SCR4 via R9, and J2 is on. The two pairs of normally open contacts J2-1 and J2-2 of J2 control reverse operation of the motor, the pinched thing is released, and meanwhile R10 detects the current of the motor. If the motor reversely runs all the way to the bottom dead center and is locked, when the lock current attains a set value, the sampling voltage on R10 triggers the thyristor SCR3, and J3 acts. The normally closed contact J3-1 of J3 switches off the relay J2, and the two pairs of normally open contacts J2-1 and J2-2 of J2 are parted with the driving motor M, thus the motor being protected.

If neither a pinched object nor a mechanical block appears during the up process of the car window, when the car window moves to a position 4 mm away from the upper dead center, the dry reed switch G is closed, and the gate of SCR4 is blocked in advance. When the window moves to the upper dead center and is locked, the sampling voltage on R1 triggers the thyristor SCR2 via the PNP transistor, J1 acts, and the two normally closed contacts J1-1 and J1-2 of J1 are parted with the driving motor M. Thus a normal closing process is completed. When the control switch K is in the "down" position, the supply voltage is reversely applied on the driving motor M via the control switch K, the two normally closed contacts J1-1 and J1-2 of J1, and the sampling resistor R1, and the motor M drives the window to move downward. If there is no block, the motor will run all the way to the bottom dead center and is locked. When the lock current attains the set value, the sampling voltage on R1 directly triggers the thyristor SCR1, J1 acts, and its normally closed contacts J1-1 and J1-2 are parted with the driving motor M. Thus a normal opening process is completed.

If the window is locked due to a block during the down process, the sampling voltage on R1 will likewise directly trigger the thyristor SCR1, J1 acts, and its normally closed contacts J1-1 and J1-2 are parted with the driving motor M, thus protecting the motor from being damaged.

Embodiment 2

Figure 3:
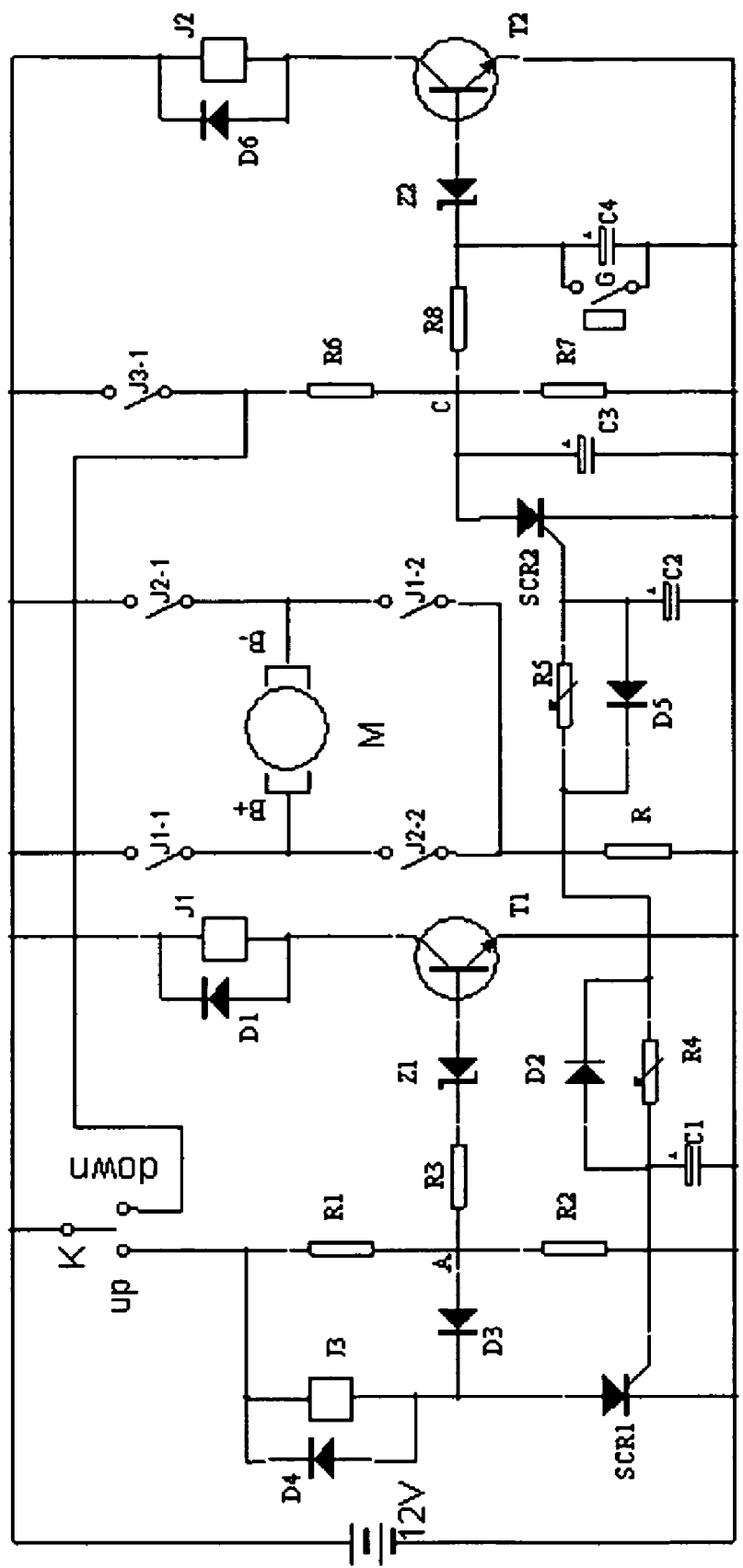
FIG. 3 is another circuit diagram of the invention.

In FIG. 3, the control switch is a single pole double throw lightly contacting switch; R is a shared sampling resistor for "moving up/moving down/anti-pinch returning/locking"; T1 is an up control transistor; T2 is a down control transistor; SCR1 is a shared thyristor for controlling "up stop/anti-pinch stop/anti-pinch returning"; SCR2 is a shared thyristor for controlling "down stop/anti-pinch returning stop"; J1 is an up control relay, and has two pairs of normally open contacts; J2 is a shared relay for controlling "moving down/anti-pinch returning", and has two pairs of normally open contacts; J3 is an anti-pinch returning signal relay, and has one pair of normally open contacts; R4 is an anti-pinch force regulation potentiometer; R5 is a down lock overcurrent regulation potentiometer; Z1 and Z2 are threshold zener; D1, D4 and D6 are freewheeling diodes; D3 is a reverse insulation diode; D2 and D5 are discharge diodes; and C1-C4 are time delay capacitors.

When the control switch is in the "up" position, the supply voltage, after the control switch, is divided by the resistors R1 and R2. The voltage at a partial voltage point A, via R3 and Z1, drives the transistor T1 to be saturated on, and the relay J1 is closed. The supply voltage is applied to the driving motor via the two pairs of closed contacts J1-1 and J1-2 of J1 and the sampling resistor R, the motor drives the window to move upward, and meanwhile the current of the motor is detected with the sampling resistor. When something is pinched, the operation resistance of the window will be increased, so will the current of the motor. When the operation resistance attains the set anti-pinch force value, the voltage on the sampling resistor R will trigger the thyristor SCR1, the potential at Point A is forced to below the threshold voltage of Z1, T1 is turned off, J1 powered off, and the window stops moving upward. Meanwhile, after SCR1 is on, so is the relay J3. The supply voltage is divided by R6 and R7 after the closed contact J3-1 of J3. The voltage at a partial voltage point C, via R8 and Z2, drives the transistor T2 to be saturated on, and the relay J2 is closed. The supply voltage is reversely applied to the motor via the closed contacts J2-1 and J2-2 of J2 and the sampling resistor R. The motor M drives the window to move downward, so as to release the pinched thing. When the window arrives at the bottom dead center and is locked, and when the lock overcurrent attains the set value, the sampling voltage triggers the thyristor SCR2, and forces the potential at Point C to below the threshold value of Z2, T2 is turned off, J2 powered off, and so is the driving motor. Thus the control process of "anti-pinch—return—stop" is completed.

If nothing is pinched during the up process of the window, when the window moves to a position 4 mm away from the upper dead center, the dry reed switch is closed, and the base of T2 is locked in advance. When the window moves to the upper dead center and is locked, the sampling voltage on R triggers the thyristor SCR1, and forces the potential at Point A to below the threshold value of Z1, T1 is turned off, J1 powered off, and so is the driving motor. Thus a normal closing process is completed.

When the control switch is in the "down" position, the supply voltage is divided by R6 and R7 via the control switch. The potential at the partial voltage point C drives the transistor T2 to be saturated on, and the relay J2 is closed. The supply voltage is applied to the driving motor via the closed contacts J2-1 and J2-2 of J2 and the sampling resistor, and the motor M drives the window to move downward. If there is no mechanical block, the motor will run all the way to the bottom dead center and is locked. When the locked overcurrent attains the set value, the sampling voltage on R triggers the thyristor SCR2 on, and forces the potential at Point C to below the threshold value of Z2, T2 is turned off, J2 powered off, and so is the driving motor. Thus a normal opening process is completed.

If the window is locked due to a mechanical block during the down process, the sampling voltage on R will likewise trigger the thyristor SCR2 on, J2 is forced to be parted, and the driving motor is powered off. Thus the motor is protected.

The above-mentioned embodiments are just the two most typical embodiments of the invention. According to the technical solution of the invention, many specific applied circuits are further designed, whose core (main) control element is still a thyristor.

Figure 4:
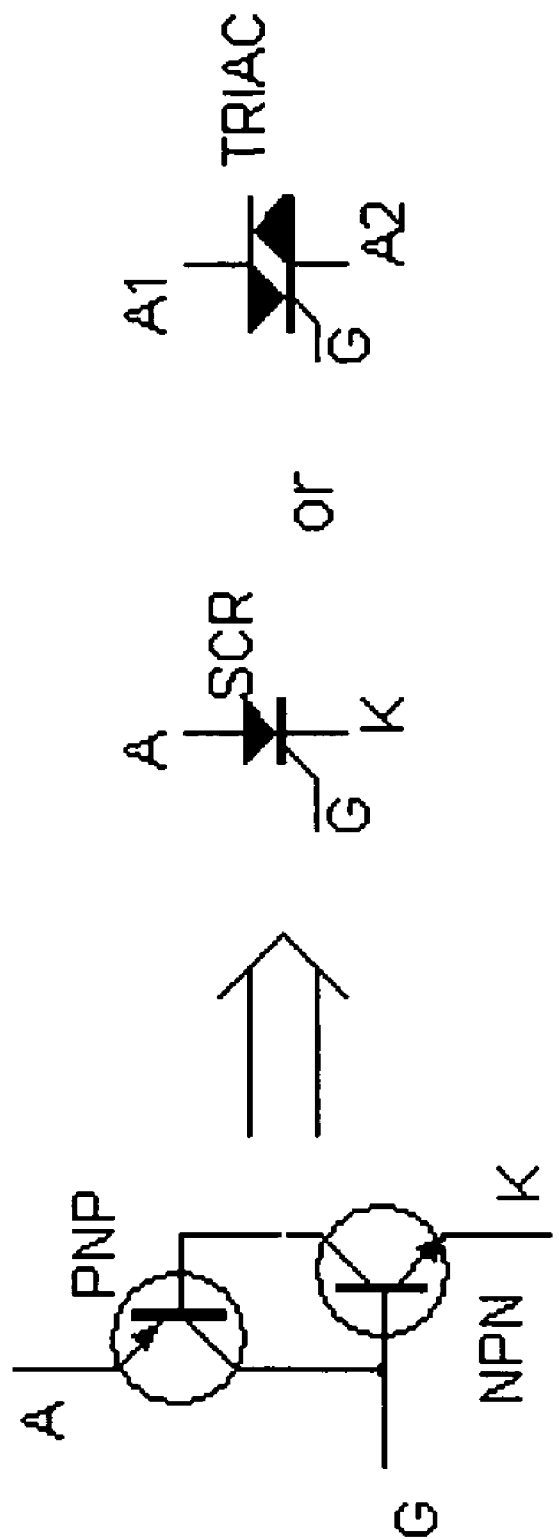
FIG. 4 is an equivalent circuit diagram where the thyristor is replaced by a transistor combination device.

With reference to FIG. 4, in the specific circuit of each of the above-mentioned embodiments, the main control element can be either a thyristor or a triac, or can also be a combination of an NPN transistor and a PNP transistor, all being completely equivalent in function. Moreover, the actuator can be either a relay or an MOS field effect transistor, or a combination of the two.

What is claimed is:

1. A device for controlling a power car window lift comprising the following elements:
    a car window closed obstacle signal detection element, controller and actuator;
    a car window opened-in-place signal detection element, controller and actuator;
    a car window closed-in-place signal detection element, controller and actuator; and
    a car window opened obstacle signal detection element, controller and actuator;
    the signal detection element detects a current signal of a driving motor of the car window lift, obtains a car window lift operation state signal and inputs the detected car window life operation state signal into a corresponding controller; the corresponding controller receives the corresponding signal, and sends a control signal to the corresponding actuator according to different car window lift operation state signals; the actuator controlling the driving motor to run according to the corresponding control signal;
    wherein the control elements of each controller include a main control element and an auxiliary control element, the main control element being a thyristor or its equivalent functional element.

2. The device for controlling the power car window lift according to claim 1, wherein the actuator is either a relay or an MOS field effect transistor, or a combination of the two.

3. The device for controlling the power car window lift according to claim 1, wherein the signal detection element is a resistor.

4. The device for controlling the power car window lift according to claim 1, wherein the car window closed obstacle controller includes a stop controller and a reverse rotation controller.

5. The device for controlling the power car window lift according to claim 4, wherein the reverse rotation controller has a blanking element.

6. The device for controlling the power car window lift according to claim 5, wherein the blanking element is a dry reed switch.

* * * * *